United States Patent [19]

Gagliani et al.

[11] Patent Number: 4,506,038

[45] Date of Patent: Mar. 19, 1985

[54] DEVELOPMENT OF POLYIMIDE FOAMS WITH BLOWING AGENTS

[75] Inventors: John Gagliani, San Diego, Calif.; Usman A. K. Sorathia, Schaumburg; Raymond Lee, Elk Grove Village, both of Ill.

[73] Assignee: I M L Corporation, Elk Grove Village, Ill.

[21] Appl. No.: 446,507

[22] Filed: Dec. 3, 1982

[51] Int. Cl.³ ................................................ C08J 9/10
[52] U.S. Cl. .................................... 521/103; 521/90; 521/114; 521/121; 521/185; 521/189
[58] Field of Search ............... 521/103, 121, 130, 107, 521/185, 189, 180, 184, 114

[56] References Cited

U.S. PATENT DOCUMENTS

| | | |
|---|---|---|
| 3,249,561 | 5/1966 | Hendrix ............................... 521/189 |
| 3,310,506 | 3/1967 | Amborski et al. ................... 521/189 |
| 3,349,061 | 10/1967 | Pruckmayr .......................... 521/189 |
| 3,705,118 | 12/1972 | Abolafia et al. ..................... 521/189 |
| 3,966,652 | 6/1976 | Gagliani et al. ..................... 521/189 |
| 4,315,076 | 2/1982 | Gagliani et al. ..................... 521/189 |

*Primary Examiner*—Morton Foelak
*Attorney, Agent, or Firm*—LeBlanc, Nolan, Shur & Nies

[57] ABSTRACT

A method of preparing a polyimide foam which includes the steps of: preparing, foaming, and curing a precursor containing at least one alkyl ester of 3,3'4,4'-benzophenonetetracarboxylic acid; a meta- or para-substituted aromatic diamine; a heterocyclic diamine; an aliphatic diamine; and a solid blowing agent. The blowing agent is added to said precursor in a concentration which is sufficient to effect at least one of the following attributes of the foam: cell size, proportion of open cells, cell density, and indentation load deflection.

10 Claims, No Drawings

DEVELOPMENT OF POLYIMIDE FOAMS WITH BLOWING AGENTS of the character discussed above is shown below. The actual reactions are typicaly much more complex depending upon the number of diamines in the precursor;

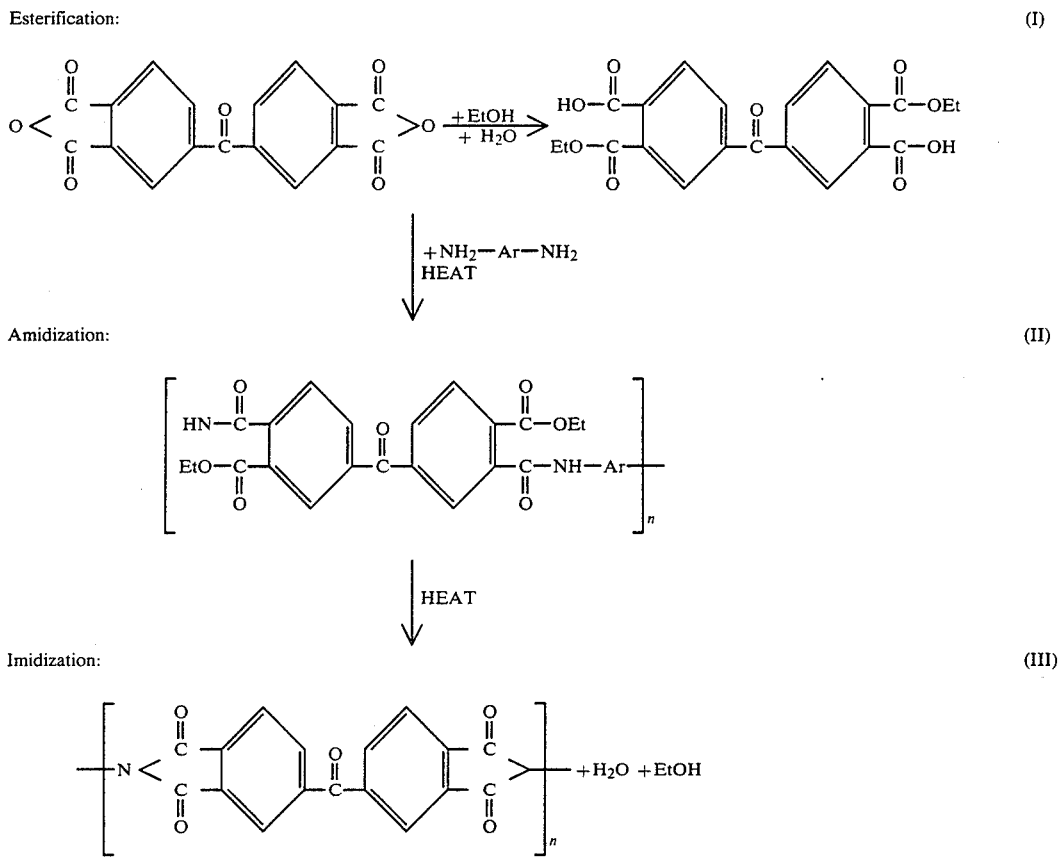

The invention described herein was made in the performance of work under NASA Contract No. NAS9-16009 and is subject to the provisions of Section 305 of the National Aeronautics and Space Act of 1958 (72 Stat. 435; 42 USC 2457).

The invention relates to the manufacture of polyimide foams and, more specifically, to the use of solid blowing agents to generate polyimide foams which have low densities and indentation load deflection (ILD) values and a relatively open cellular structure with larger cell sizes.

U.S. Pat. Nos. 3,966,652 issued June 29, 1976, and 4,315,076 issued Feb. 9, 1982, both to Gagliani et al, disclose hydrolytically stable copolyimide and terpolyimide foams which are fire resistant and give off essentially no smoke or toxic fumes when they are heated to degradation temperatures. Consequently, those foams are useful in aircraft cabins, space vehicles, and land and sea transport and in a variety of other applications where human life or equipment might be endangered by the overheating of conventional, more flammable, smoke-emitting materials.

The polyimide foams described in the foregoing patents are derived from precursors which contain an alkyl diester of 3,3',4,4'-benzophenonetetracarboxylic acid or a mixture of such esters; an aromatic diamine; a heterocyclic diamine; and, in the case of the terpolymers, an aliphatic diamine.

The general model for the chemical reactions which are effected in converting the precursor to a polyimide In the formation of the patented polyimides, a cellular structure is developed by a blowing agent generated in situ in the polymeric precursor. This blowing agent is a mixture of water and lower alkyl alcohol(s) (typically methanol or ethanol). Those compounds are the by-products of the condensation and polymerization reactions illustrated above.

The expansion of water and alcohol(s) within the reaction mass produces polyimide foams which are flexible and resilient and have a fine cellular structure.

At times foams with larger cell sizes than can be obtained by relying on the in situ generated blowing agent to develop the cellular structure are better suited to the application at hand. It has now been found that foams with this attribute and lower densities, lower ILD values, and more open cellular structures, all of which are desirable, can be obtained by incorporating a solid blowing agent into the polymeric precursor. At the same time the cell size, percentage of open pores, foam density, and ILD value of the foam can be controlled by the concentration of the blowing agent in the precursor.

One primary object of the present invention resides in the provision of novel polyimide foams.

Other important but more specific objects of the invention reside in the provision of polyimide foams derived from precursors that are essentially non-polymeric mixtures of tetracarboxylic acid esters and primary diamines and which, in comparison with the previously disclosed foams of that character identified above, may have: a larger cell size, a lower density, a lower ILD value(determined with an Instron Universal Test Machine in accord with ASTM D-1564), and a more open cellular structure.

Another important and primary object of the present invention resides in the provision of methods for producing or developing polyimide foams of the type and with the attributes identified in the preceding object.

Still another important and primary object of the invention is the provision of methods in accord with the preceding object which have the capability of controlling the previously identified attributes of the foam.

Other important objects and additional features and advantages of the invention will become apparent from the foregoing, the appended claims, and the ensuing more detailed description and discussion of the invention.

Solid blowing agents which can be used in the practice of the present invention include: Celogen TSH, Celogen OT, Celogen AZ 130, Celogen RA, Celogen HT 500, Celogen HT 550, sodium bicarbonate, benzene sulfonyl hydrazide, sodium borate, boric acid, benzoic acid, and Expandex 5 PT. The chemical compositions of the blowing agents identified by trade name above follow.

| Blowing Agent | Chemical Composition |
|---|---|
| Celogen TSH | toluene sulfonyl hydrazide |
| Celogen OT | p,p'-oxybis(benzene sulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Celogen HT 550, sodium bicarbonate, and Expandex 5 PT produce foams which are flexible and have a more open cellular structure than those produced under the same process conditions without the blowing agent.

It is pointed out to the reader that all of the compositions identified above are known blowing agents. However, it has not heretofore been known that such blowing agents could be employed to make polyimides from precursors of the type described above at all, let alone that such foams would have the desirable attributes that they have been found to possess.

Variations in the concentration of the blowing agent can be used to obtain to achieve specific densities and ILD values. Concentrations of up to 10 percent based on the weight of the polymeric precursor have been successfully employed. A concentration of 2.5 weight percent has been selected as standard for flexible resilient foams.

The terpolymers of the present invention are derived from precursors which, in their preferred forms, are essentially equimolar mixtures of a lower alkyl half ester of 3,3'4,4'-benzophenonetetracarboxylic acid or a mixture of such esters and three primary diamines. One of the diamines is a heterocyclic diamine, the second is an aromatic meta- or para-substituted diamine which is free of aliphatic moieties and the third is an aliphatic diamine. A ratio of 0.4 to 0.6 mole of heterocyclic diamine per mole of 3,3',4,4'-benzophenonetetracarboxylic acid ester is preferred. However, precursors having a heterocyclic diamine/acid ester ratio of 0.3 have also successfully been employed.

From 0.05 to 0.3 mole of aliphatic diamine per 1.0 mole of 3,3'4,4'-benzophenonetetracarboxylic acid ester(s) can be employed, and from 0.1 to 0.3 mole of heterocyclic diamine per mole of ester constituent can be used.

Exemplary of the aromatic and heterocyclic diamines that can be employed in the just described terpolyimides are:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene Many other aromatic and heterocyclic diamines have been described in the open and patent literature dealing with the making of polyimides—see, for example, U.S. Pat. Nos. 3,179,614 issued Apr. 20, 1965, to Edwards; 3,575,891 issued Apr. 20, 1971, to LeBlanc et al; and 3,629,180 issued Dec. 21, 1971, to Yoda et al. Aromatic and heterocyclic diamines selected from those listed in the literature can also be utilized in terpolyimides of the character described above.

Aliphatic diamines having from three to 12 carbon atoms have been employed in the terpolyimides. However, diamines having no more than six carbon atoms will typically prove preferable. Also, aliphatic diamines with even numbered chains are preferred.

Aliphatic diamines we have used include:
1,3-diaminopropane
1,4-diaminobutane
1,6-diaminohexane
1,8-diaminooctane
1,12-diaminododecane and Jeffamine 230. The latter is available from the Jefferson Chemical Company and has the formula:

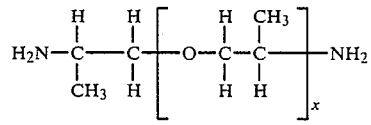

where x is approximately 2.6.

The precursors of the polyimides with which we are concerned are prepared by first reacting 3,3',4,4'-benzophenonetetracarboxylic acid (or, preferably, its dianhydride) with an esterification agent to form an alkyl diester or half ester. Exemplary esterification agents are methyl, ethyl, propyl, and isopropyl alcohols. Methanol is in many cases preferred because of its widespread availability, low cost, and other attributes and because its use facilitates conversion of the precursor to a polyimide. Ethanol is also a preferred esterification agent.

The esterification reaction is followed by the addition of the diamines, which are dissolved in the reaction mixture. The temperature is kept below the reflux temperature of the esterification agent during dissolution of the diamines and low enough to avoid polymerization of the diamines and ester.

Next, the blowing agent is mixed with the essentially non-polymeric, polyimide precursor existing after the diamines have been dissolved in the reaction mixture.

Graphite, glass, and other fibers as well as other fillers such as glass microballoons and additives such as cross-linking agents can be added to the resulting composition to impart wanted properties to the final product. A surfactant can also be added to increase fatigue resistance and to make the foam more flexible and resilient by increasing its bubble stability and the uniformity of the cellular structure.

One preferred surfactant is FS-B, a nonionic, fluorinated, polyalkylene copolymer manufactured by E. I. DuPont de Nemours and Company.

Other surfactants that have been successfully employed are FS-C, AS-2, and X-3, nonionic surfactants of the same general chemical composition as FS-B and manufactured by the same company and L-530, L-5410, L-5430, which are silicone surfactants manufactured by Union Carbide Company. We employ from 0.015 to 1.5 percent of surfactant based on the weight of the ester and diamine constituents.

The material existing after dissolution of the diamines and the addition of the blowing agent (and any other additives) may range in form from a "liquid resin" to a spreadable, paste-like formulation depending upon the nature and quantity of any fillers added to the resin. The material may be used in the form just described; or it can be transformed into an amorphous powder capable of being converted into a flexible, resilient foam. Although not essential, it is preferred that spray drying be employed for this purpose because the liquid resin can thereby be transformed on a continuous basis and in one step into a dry powder. Also, spray drying allows for modification of the precursor in ways which can be used to vary the properties of the final product.

One suitable spray drying process is described in U.S. Pat. No. 4,296,208 issued Oct. 20, 1981, to Gagliani et al. In general that process involves the atomization of the feedstock followed by entrainment of the droplets thus formed in a swirling annulus of heated air (or other gas). This produces almost instantaneous drying of the droplets. Optimum results are typically obtained by employing spray dryer chamber gas inlet temperatures in the range of 100°–110° C. and by so regulating the flow of material through the dryer as to limit the chamber outlet temperature of the gas to 80° C.

The precursor, whether or not it is first dried, is heated to develop a cellular physical structure and a polyimide chemical structure.

Thermal heating may be employed for these purposes. Temperatures of 230° to 315° (446° to 600° F.) for periods of 15 to 30 minutes have proven capable of foaming and curing the precursor. Another regime that has proven satisfactory involves heating the formulation first at a temperature of 104° C. to 163° C. (220° to 325° F.) for 15 to 20 minutes to develop the foam and then at a temperature of 288° to 315° C. (550° to 600° F.) for 30 to 60 minutes to cure it.

Alternatively, the foaming and curing of the precursor, or those steps and the drying step, can be accomplished by microwave heating.

Foaming-curing parameters that have proven satisfactory in converting representative precursors to the corresponding polyimide foams are two to twelve minutes exposure to high frequency radiation in an oven operating at a frequency of 915 to 2450 mHz, at a 3.75 to 15 kW power output, and at a power output to precursor weight ratio of 0.6 to 1 kW/kg.

Drying can be carried out as an earlier stage in the same oven using a power output of 1.25 to 2.5 kW, also for 2 to 12 minutes.

Steady application of the microwave energy is not required, and pulsed or cyclic exposure of the precursor to the microwave energy may even produce superior results. Typically, the duration of the microwave energy pulses and of the intervals therebetween will be on the order of 60 and 20 seconds, respectively.

Also, conductive fillers can often advantageously be incorporated in the precursor to promote its conversion to a polyimide by generating additional thermal energy. From 5 to 20 weight percent of activated carbon or graphite can be employed for that purpose.

Similarly, an optimum product can in many, if not most, cases be obtained by heating the substrate or mold on or in which the precursor is foamed to a temperature of from 121.1° to 148.9° (250° to 300° F.) before the precursor is exposed to microwave energy.

In addition, the microwave heating step or steps can often be followed to advantage by a thermal postcure of the polyimide. This is accomplished by heating the product of the microwave heating step in a circulating air oven at a temperature of 500° to 550° F. for 30 to 200 minutes.

The microwave technique for heating the precursor requires that a substrate or mold material which is compatible with the microwave radiation be employed. If a mold technique is used, the material must also have sufficient flexural strength to withstand the pressure of the expanding foam. Substrate and mold materials that have been found suitable include Ridout Plastics Company (wholesaler) polypropylenes lined with a Teflon-coated glass (Taconic 7278); Pyroceram (a Corning Glass Works crystalline ceramic made from glass by controlled nucleation); and glass filled polyimides. Other materials possessing the necessary attributes discussed above can also be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embranced therein.

What is claimed and desired to be secured by U.S. Letters Patent is:

1. A method of preparing a polyimide foam which includes the steps of: preparing, foaming, and curing a solvent-free precursor consisting essentially of at least one alkyl ester of 3,3'4,4'-benzophenonetetracarboxylic acid; a meta- or para-substituted aromatic diamine; a heterocyclic diamine; an aliphatic diamine; and a solid blowing agent, said blowing agent being present in said precursor in a concentration which is sufficient to affect at least one of the following attributes of the foam: cell size, proportion of open cells, cell density, and identation load deflection.

2. A method of preparing a polyimide foam as defined in claim 1 wherein the 3,3'4,4'-benzophenonetetracarboxylic acid ester and the diamine constituents are present in said diamine, ester solution in amounts such that the imide forming functionalities are substantially equimolar.

3. A method of preparing a polyimide foam as defined in claim 1 wherein the heterocyclic and aromatic diamines are selected from the group consisting of:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene.

4. A method of preparing a polyimide foam as defined in claim 1 in which the diamine, ester solution contains from 0.05 to 0.3 mole of aliphatic diamine and from 0.1 to 0.3 mole of heterocyclic diamine per mole of 3,3'4,4'-benzophenonetetracarboxylic acid ester.

5. A method of preparing a polyimide foam as defined in claim 1 wherein the aliphatic diamine, in the diamine ester solution has from three to twelve carbon atoms.

6. A method of preparing a polyimide foam as defined in claim 1 wherein the aliphatic diamine in the diamine, ester solution has the formula

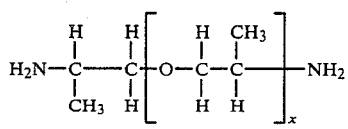

where the x is on the order of 2.6.

7. A method of preparing a polyimide foam as defined in claim 1 wherein said solid blowing agent is present in said precursor in a concentration of not more than ten percent based on the weight of the precursor.

8. A method of preparing a polyimide foam as defined in claim 7 wherein said blowing agent is present in said precursor in a concentration of about 2.5 percent based on the weight of the precursor.

9. A method of preparing a polyimide foam as defined in claim 1 wherein the solid blowing agent is one of the following:
toluene sulfonyl hydrazide
p,p'-oxybis(benzenesulfonyl hydrazide)
azodicarbonamide
p-toluenesulfonyl semicarbazide
hydrazole dicarboxylate
sodium bicarbonate
benzene sulfonyl hydrazide
sodium borate
boric acid
benzoic acid.

10. A method of preparing a polyimide foam as defined in claim 5 wherein the aliphatic diamine is selected from the group consisting of:
1,3-diaminopropane;
1,4-diaminobutane
1,6-diaminohexane
1,8-diaminooctane
1,12-diaminododecane.

* * * * *

UNITED STATES PATENT AND TRADEMARK OFFICE
CERTIFICATE OF CORRECTION

PATENT NO. : 4,506,038

DATED : March 19, 1985

INVENTOR(S) : Gagliani et al

It is certified that error appears in the above-identified patent and that said Letters Patent is hereby corrected as shown below:

On the title page

In the Abstract, line 8, change "effect" to --affect--

Column 2, line 3, change ";" to --:--

Column 8, line 14, insert "solid" after --said (first occurrence)--.

Signed and Sealed this

Sixteenth Day of July 1985

[SEAL]

*Attest:*

DONALD J. QUIGG

*Attesting Officer*     *Acting Commissioner of Patents and Trademarks*